United States Patent [19]

Muniz

[11] 3,712,408
[45] Jan. 23, 1973

[54] METHOD OF AND APPARATUS FOR CREATING A SHOCK WAVE BENEATH THE SURFACE OF A BODY OF WATER
[75] Inventor: Raymond Muntz, 78 Versailles, France
[73] Assignee: Compagnie Generale De Geophysique, Paris, France
[22] Filed: July 31, 1970
[21] Appl. No.: 59,983

[30] Foreign Application Priority Data

Aug. 1, 1969 France..................................6926481

[52] U.S. Cl. ...........................181/.5 H, 181/0.5 NC
[51] Int. Cl. ...............................................G01v 1/14
[58] Field of Search.....................................181/.5 H

[56] References Cited

UNITED STATES PATENTS 3,094,968  6/1963  Post......................................181/.5 H 3,368,641  2/1968  Cholet et al........................181/.5 NC

FOREIGN PATENTS OR APPLICATIONS 826,932  1/1960  Great Britain ..................181/.5 VM Primary Examiner—Benjamin A. Borchelt
Assistant Examiner—N. Moskowitz
Attorney—Oberlin, Maky, Donnelly & Renner

[57] ABSTRACT

A shock wave is produced in a body of water for seismological study of the underlying ground by abruptly liberating at a desired depth in the interior of the body of water a quantity of steam under pressure so as to form a body of steam in the interior of the water. This body of steam, after its release, condenses violently as a result of its cooling and this violent condensation creates an implosion giving rise to a shock wave suitable for use in seismic prospecting.

11 Claims, 3 Drawing Figures

METHOD OF AND APPARATUS FOR CREATING A SHOCK WAVE BENEATH THE SURFACE OF A BODY OF WATER

The present invention relates to a method and apparatus for creating a shock wave beneath the surface of a body of water, particularly beneath the surface of the sea. Such a shock wave is conventionally used for the study by seismic methods of the geological structures of the ground situated beneath the body of water.

At the present time, several methods are known for producing such a shock wave. In a first method, for example, an explosive charge is set off beneath the water. In another method, known as an "air cannon," a certain quantity of gas under pressure is injected beneath the surface of the water. In still another method, a high tension arc is struck between two immersed electrodes. It has also been proposed to explode a conducting element placed between the electrodes.

While a number of these methods are today put in practice, they all present the disadvantage of producing a principal shock wave which is inevitably accompanied, as a result of the seismic source used, by secondary parasitic pulsations, known as the "bubble effect." The existence of these parasitic pulses renders the interpretation of the reflected or refracted waves very difficult.

The present invention relates to a method of creating a shock wave as the result of the use of a physical process which has not heretofore been used for this purpose. In accordance with the invention, a predetermined quantity of steam under pressure is suddenly released at a predetermined depth beneath the water to form a volume of steam within the body of water where the shock wave is to be created, this volume of steam being subjected on its release, as a result of its being cooled, to sudden contraction by condensation, such contraction creating an implosion giving rise to the desired shock wave. Such a method is of particular practical interest since it enables a shock wave to be created which is substantially free of parasitic pulsations, which is, as above noted, a significant advantage in relation to the prior art methods.

In the method of the invention, saturated steam may be used at the temperature lying, for example, between 150° and 370°C. Advantageously, however, superheated dry steam is used, for example a dry superheated steam at a temperature lying between 250° and 450°C under a pressure of 30 to 75 kg/cm$^2$.

A further object of the present invention is to provide an installation preferably mounted on board a ship, floating platform or the like, for carrying out the method of the invention. The installation comprises a system for generating steam under pressure, means for conducting this steam to a precise point beneath the surface of the water and means for abruptly liberating at this precise point a predetermined quantity of steam under controlled conditions of temperature and pressure.

In accordance with a further aspect of the invention, the means for conducting and liberating the steam at a precise point form part of an injection head which is displaceable and orientatable relative to the generating system. Preferably, a continuous circulation of steam is maintained in the injection head between the system for generating steam and the lower end of the injection head in the position where the liberation of steam takes place.

Other characteristics and advantages of an embodiment of the invention will appear from the following description in which reference is particularly made to the accompanying drawings, in which:

FIG. 3 is a diagram showing the shock wave created by the method of the invention, the time T being shown as abscissa and the pressure $p$ as ordinate.

Figure 1:
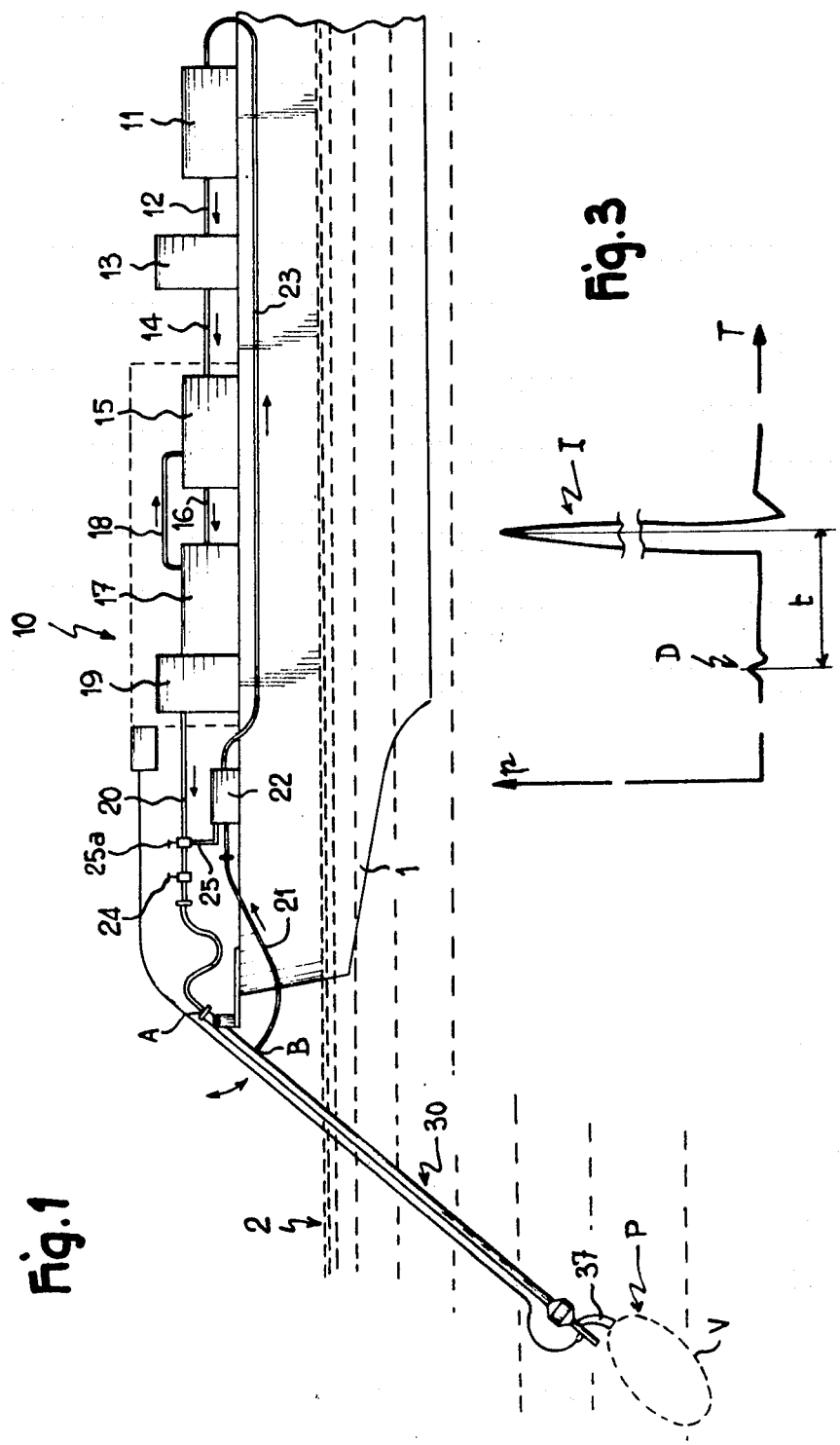
FIG. 1 is a diagrammatic view of a typical installation in accordance with the present invention.

Referring now in detail to the application drawings, in which like parts are designated by like reference characters, in FIG. 1 the reference numeral 1 indicates the stern of a ship equipped for seismological study floating on a body of water 2, in which it is desired to create a shock wave at a point P.

The installation comprises a steam generator assembly generally indicated at 10 mounted on the ship and an injection head generally indicated at 30 mounted on the ship so as to be displaceable and orientatable in relation thereto, and to be capable of being immersed in the sea so that its end may be in the neighbourhood of the point P where it is desired to create the shock wave.

The assembly 10 comprises a fresh water reservoir 11 connected by a conduit 12 to a demineralization system 13 in which the water is completely purified of any mineral content. The demineralized water passes by a conduit 14 to a closed reservoir 15 from which it passes by a conduit 16 to a boiler 17. A return conduit 18 is provided between the boiler 17 and the sealed reservoir 15. The boiler 17 is advantageously a tube boiler capable of producing saturated steam at a temperature of the order of 275° C. At the outlet of the boiler 17, the steam is sent to a superheater 19 where it is superheated to the condition of dry steam under pressure (for example 400° C and 60 kg/cm$^2$). A conduit 20 connects the superheater to the inlet A of the injection head 30.

The injection head is preferably continuously traversed by the steam which is introduced into the head by the inlet A and leaves it by an outlet B. A return circuit is preferably provided between the outlet B and the fresh water reservoir 11, this return circuit comprising a steam conduit 21, a condenser 22 where the returning steam is condensed, and a water conduit 23. Preferably, a valve 24 is mounted in the conduit 20 to control the supply of steam to the injection head. Further, a purging circuit 25 controlled by a valve 25a enables the outlet of the steam superheater to be directly connected to the condenser 22.

In the invention thus far described, it will be seen that the assembly 10 enables any desired quantity of superheated steam to be dispatched to the inlet A of the injection head 30, with the steam leaving the head at B being recycled.

Figure 2:
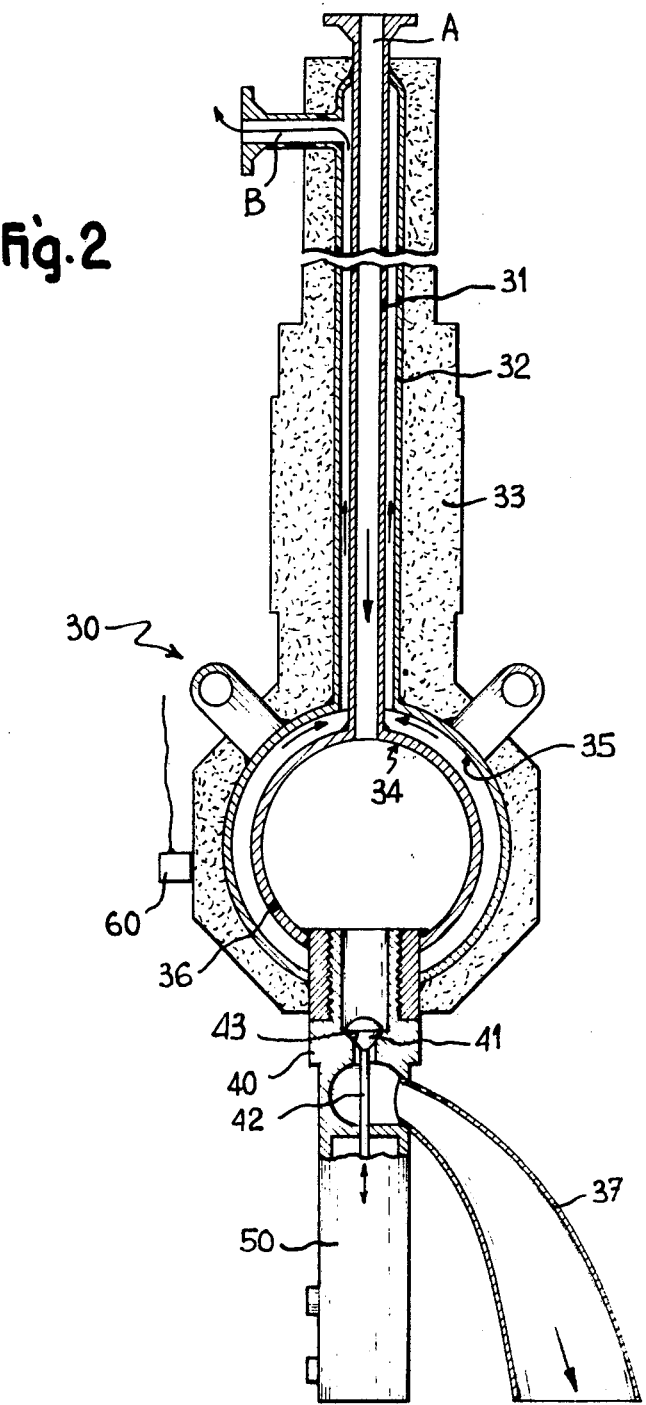
FIG. 2 is a sectional view of the injection head of this installation.

Referring to FIG. 2, the injection head 30 comprises two coaxial metal tubes 31 and 32 surrounded by thermal insulation 33, glass wool, for example, which in turn is surrounded by a watertight protective sleeve. One end of the inner tube 31 constitutes the inlet A of the injection head 30. At the end opposite to inlet A, the tube 31 is connected to a spherical chamber 34 and the end of the tube 32 to a spherical chamber 35 surrounding the chamber 34. Openings 36, only one of which is visible in FIG. 2, are provided in the wall of the chamber 34 to connect the internal space of this chamber with the space of the chamber 35 which surrounds it.

At the end of the injection head is disposed a valve 40 capable of communicating the interior of the chamber 34 with a steam ejector member 37 in the form of a horn. The valve 40 comprises a valve member 41 mounted on the end of a stem 42, the valve member 41 co-operating with a valve seat 43. Displacement of the stem 42 is effected by a rapid displacement remote control system 50, for example, a pneumatic or electrical actuator.

The steam circuit between A and B can be readily seen: when the valve 40 is closed, steam entering the injection head 30 at A flows through the tube 31, enters the chamber 34, flows through the orifices 36 into the chamber 35 and returns to the outlet B through the annular space lying between the two tubes 31 and 32. When the valve 40 is abruptly opened, under the action of the system 50, the volume of steam contained in the chamber 34 is ejected through the ejector 37.

The operation of the device described above is as follows. The injection head 30 is disposed so that its ejector 37 discharges at the point B where it is wished to create the shock wave. Steam circulation is established in the injection head 30 in such a manner that the chamber 34 is constantly filled with dry superheated steam, for example at a temperature lying between 250°and 450° C under a pressure lying between 30 and 75 kg/cm$^2$.

In order to create the shock wave, the valve 40 is caused to open for a very brief interval of time, for example, for between 3 and 150 milliseconds. The dry steam contained in the chamber 34 is ejected at the point P to form a volume of dry steam V (FIG. 1) in the interior of the body of water. This volume of steam contracts very rapidly as a result of its being condensed by the cooling thereof caused by the surrounding body of water. In a very short time, of the order of several tens of milliseconds, starting from the beginning of the discharge, the steam-water equilibrium between the volume V and the surrounding water is broken and this causes the quasi-instantaneous disappearance of the volume V by flash condensation. This disappearance causes an implosion in the course of which the surrounding water replaces the steam in the volume V. It is this implosion by condensation which creates the desired shock wave. This shock wave is not accompanied by secondary shock waves which adversely affect the seismic measurements: the initial release of the steam most often only produces a negligible effect relative to the implosion.

In a typical example, an injection head is used, the ejector of which is disposed at a depth of 7 meters below the surface of the sea. The chamber 34 has a volume of 30 dm$^3$. The valve seat 43 has a steam passage diameter of 7 cm. The steam filling the chamber 34 is dry steam at a temperature of 350°C under a pressure of 50 kg/cm$^2$. The time during which the valve 40 is open is 30 milliseconds. In these conditions, there is observed at a distance of 1 meter from the ejector (FIG. 3) a shock wave comprising first of all a small discharge implosion D of an amplitude of the order of 0.8 kg/cm$^2$, and then after an interval of time $t$, of the order of 40 milliseconds, an implosion peak I of the order of 40 kg/cm$^2$.

It will be seen that the implosion I is by far the preponderant phenomenon and that the implosion shock wave is substantially free of parasitic shock waves.

In practice, for recording the shock wave, the instant of opening the valve 40 may be used as time datum or more exactly the instant at which the system 50 is instructed to operate. There could also be used for this purpose the start of the said discharge as detected for example by a hydrophone 60 disposed in the neighbourhood of the ejector 37.

It will be understood that steam which is simply saturated could be used as well as superheated steam, although superheated steam is preferable. Further, although it is advantageous at the present time to produce shock waves for the formation of which the phenomenon of implosion is largely preponderant, with a view to producing a shock wave which is practically free from parasitic secondary waves, it is nevertheless within the scope of the present invention to use the phenomenon of implosion in conjunction with the phenomenon of expansion in order to create a train of waves adapted to any particular requirement of seismic prospecting through a liquid medium.

The method according to the invention, besides the essential advantage of a shock wave which is not accompanied by parasitic pulsations, lends itself particularly well to exploitation in shallow water since it operates as a result of a thermal exchange between steam and water.

I claim:

1. The method of creating a shock impulse in the interior of a body of water to conduct geophysical studies by seismic methods, comprising the steps of generating steam under controlled pressure and temperature, continuously delivering said generated steam to a selectively closed chamber and abruptly liberating in a predetermined location in said body of water a single quantity of said steam to create a single relatively large steam bubble which imploses violently as a result of its cooling in said body of water thereby creating a single shock of high energy level useable as a seismic underwater signal.

2. The method according to claim 1, in which the liberated steam is initially in the state of dry superheated steam.

3. The method of claim 2 wherein the dry superheated steam is at a temperature between 250° and 450°C and under a pressure of 30 to 75 kg/cm$^2$.

4. The method of creating a shock impulse in the interior of a body of water to conduct geophysical studies by seismic methods, comprising the steps of generating steam, continuously circulating said steam so as to keep it under controlled pressure and temperature conditions, and abruptly liberating in a controlled manner a single quantity of said steam in a predetermined location in said body of water to create a single, relatively large steam bubble which imploses violently as a result of its cooling in said body of water, thereby creating a single shock of high energy level usable as a seismic underwater signal.

5. The method of claim 4 in which the liberated steam is initially in the state of dry superheated steam.

6. The method of claim 5 wherein the dry superheated steam is at a temperature between 250° and 450°C and under a pressure of 30 to 75 kg/cm².

7. The method of claim 4 wherein said steam is circulated to and from a steam reservoir.

8. Apparatus for creating a shock wave in a body of water by liberation of a volume of steam which is then violently condensed, comprising a steam generator system for generating steam under controlled pressure and temperature, a steam injection head operatively connected to said steam generator system and defining a steam chamber for continuously receiving steam generated thereby, said injection head being movable relative to said system for locating the same at the desired depth and position in said body, and means including a valve for selectively communicating the interior of said injection head with the surrounding mass of water whereby said steam is violently condensed creating a shock wave useful for seismic prospecting.

9. The apparatus of claim 8 further including a steam ejector mounted on said head and extending into said mass of water, said valve means controlling the communication of said chamber with said ejector.

10. The apparatus of claim 9 in which said injection head comprises two concentric tubes forming between them an annular space, said inner tube supplying said steam chamber, said annular space serving as a return circuit for the steam which can thus circulate continually through the injection head.

11. The apparatus of claim 9 in which said steam generator system comprises a fresh water reservoir, a boiler and a superheater for producing the steam for supplying the injection head, said return circuit comprising a cooler for recycling to the reservoir condensed water from the steam returning from the injection head.

* * * * *

UNITED STATES PATENT OFFICE
CERTIFICATE OF CORRECTION

Patent No. 3,712,408         Dated January 23, 1973

Inventor(s) RAYMOND MUNIZ

It is certified that error appears in the above-identified patent and that said Letters Patent are hereby corrected as shown below:

In the heading on page 1 of the patent (item "75") change patentee's last name from "Muntz" to --Muniz--.

Signed and sealed this 10th day of July 1973.

(SEAL)
Attest:

EDWARD M. FLETCHER, JR.　　　　　　　Rene Tegtmeyer
Attesting Officer　　　　　　　　　　　Acting Commissioner of Patents